March 24, 1931. G. LANGFORD Re. 18,011

RENEWING WORN ANGLE BARS

Original Filed March 10, 1928

Inventor
George Langford
By Brown, Jackson, Boettcher & Dienner.
Attys.

Reissued Mar. 24, 1931

Re. 18,011

UNITED STATES PATENT OFFICE

GEORGE LANGFORD, OF JOLIET, ILLINOIS, ASSIGNOR TO McKENNA PROCESS COMPANY OF ILLINOIS, OF JOLIET, ILLINOIS, A CORPORATION OF ILLINOIS

RENEWING WORN ANGLE BARS

Original No. 1,732,650, dated October 22, 1929, Serial No. 260,695, filed March 10, 1928. Application for reissue filed November 5, 1930. Serial No. 493,594.

My invention relates to angle bars or fish plates employed in making rail joints, and more particularly to reformed angle bars and the process of reforming or reclaiming worn-out angle bars.

It is known that in use in the track the ends of the joined rails in a joint and the bars connecting said ends wear away due to the rolling of the wheels over the joint. The bearing surfaces, that is, the angular surfaces which are wedged together when the plates are drawn in to the web of the rails, become worn away to a maximum extent on the ends of the rails and the central part of the bars.

It has been proposed heretofore to reform the bars by heating them and reforming them in closed dies, and it is known that in the reforming operation it is desirable to increase the vertical height of the bars along the center so as to make up for the metal worn from the ends of the rails. This is known as crowning the bar. It has heretofore been practiced by holding the bar in such a manner that it could not increase in length, and subjecting it to enormous pressure, thereby forcing metal from the entire length of the bar to flow towards the center and laterally at the center to form the crowns on the bearing surfaces. It has been found in practice that the pressures which are required to do this are enormous for even moderately worn plates, and for badly worn plates the pressure required is so great as to break even the largest commercial presses. I have conceived the possibility of diminishing the thickness of the bar along its neutral axis to supply the necessary metal for filling out the worn part of the bar and for supplying the metal required to provide the crown. In other words, I apply a spreading pressure at the central part along the neutral axis before closing the dies at the edges. In this way the vertical height along the center third may be increased to produce the necessary crown without resorting to very great pressure in reforming the bar.

It is essential that the distance between the angles of the head and flange bearing surfaces be exact to a predetermined amount, and that the inside of the head be also as predetermined. The height or distance between the bearing surfaces and the angles thereof determines the fit of the fishing, and the space between the inner side of the bar head and the rail web is the draw or amount of takeup available before the bar is considered worn out. As stated, the fit of fishing and the draw must be precise and only a small departure from prevision is tolerated by the users. A tolerance of one sixty-fourth of an inch over the specified fishing height and one thirty-second of an inch over the specified draw space is permitted. There are no tolerance allowances on less than the fishing height and draw space specified.

Where the wear on the bearing surfaces of the bars is considerable it is obvious that there must be considerable shifting of metal, particularly in a vertical direction, in order that precision in the fit of the renewed or reformed bar may be obtained, and the great difficulty heretofore has resided in forcing the required shifting.

In the practice of my invention I relieve the pressure on the end sections (or thirds of the bar in a short bar) and exert effective pressure on the central portion (or third of the bar in a short bar), producing thereby a renewed or reformed bar thinner than the original bar at the center but higher than the worn bar because of the outward movement of the metal. Such outward movement of the metal may be carried to a point where the height of the bearing surfaces is restored to that of the original bar, or it may be carried to a point beyond the original dimensions to produce the desired crown. I thereby secure a satisfactory reformed or renewed bar with much less expenditure of energy and greater certainty of operation.

Although the strength of the bar produced by my invention is decreased horizontally at the center, it is actually increased in vertical bending strength because of the comparatively great distance of the additional metal from the neutral axis. That is to say, the vertical bending movement of the reformed or renewed bar is as great as or greater than the bar as originally manufactured.

In practice I make the greater part of the differences of section, that is, movement of the metal, on the inside of the bar where such differences in section are more permissible than on the outside. The worn center is preferably worked without interference from the ends, the effect of such working being waves of pressure beginning at the center and moving in all directions therefrom, and the metal flowing in accordance with the waves of pressure.

There are short and long angle bars in use, the former varying from 24 to 28 in. in length, and the latter varying from 36 to 42 in. in length. The greatest stress on the bar is taken up by one-third and by one-fourth the length of the short bars and long bars respectively, the balance being taken up by the end portions.

My invention applies equally to all lengths of bars, but for the purpose of illustration I have shown in the accompanying drawings a short bar.

Now in order to teach those skilled in the art how to practice my invention I have shown in the accompanying drawings for the purposes of illustration the specific embodiment of the invention and the mode of producing the same.

Throughout this specification where reference is made to the inside of the bar or plate, it is to be understood as the side normally positioned toward or facing the rail while in use, and the outside refers to the side away from the rail.

The angle bar or fish plate 5, as originally manufactured, is represented by the dotted outline which, in some parts, coincides with the solid outline, representing a section at the center of the reformed angle bar. The ends of the bar receive practically no wear and, consequently, require little or no reforming, but the central portion needs considerable reforming, as heretofore explained.

Figure 2:
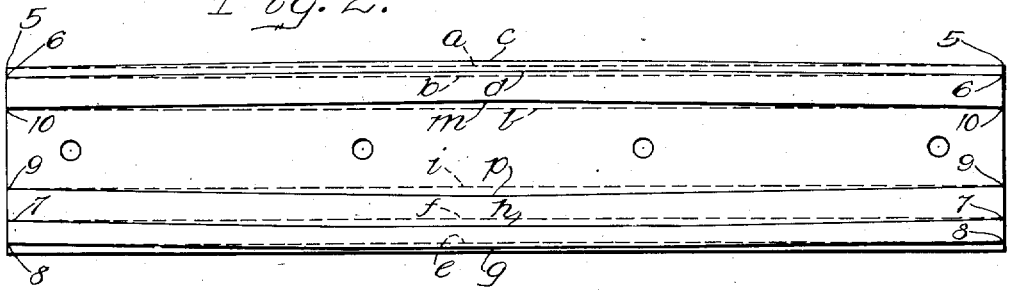
Fig. 2 is an elevational view of the reverse side or inside of that shown in Fig. 1.
Figure 3:
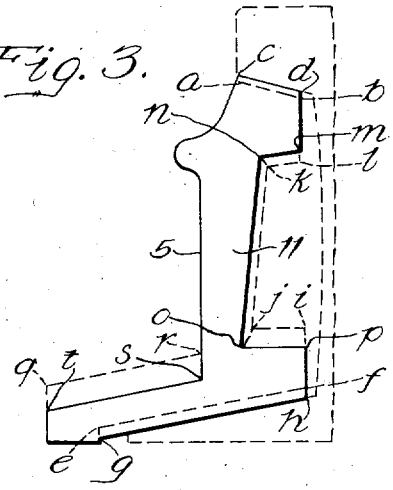
Fig. 3 is a sectional view taken on the line 3—3 of Fig. 1 and showing also the end of one-half of a rail in dotted outline.

When necessary, all of the outside surfaces may be modified, but preferably, as shown in Fig. 3, I have confined the greater part of the modification to the inside surfaces. The head crowning is represented by the perpendicular distance between the line *a—b* and the line *c—d* in Fig. 3, which, in practice, averages about .025 inches, depending on the amount the bar is worn, and this crowning tapers to zero at the ends of the bar, as shown at 5 and 6 in Figs. 1 and 2.

In the preferred practice of the invention where crowning is employed the head surface is raised substantially a uniform height along the central third or fourth of the length of the bar and this rise tapers off to nothing at the ends. That is to say, I do not in practice make a smooth curve as might be inferred from Fig. 1 but rather a flat raised part at the center and tapered shoulders at the ends.

Figure 1:
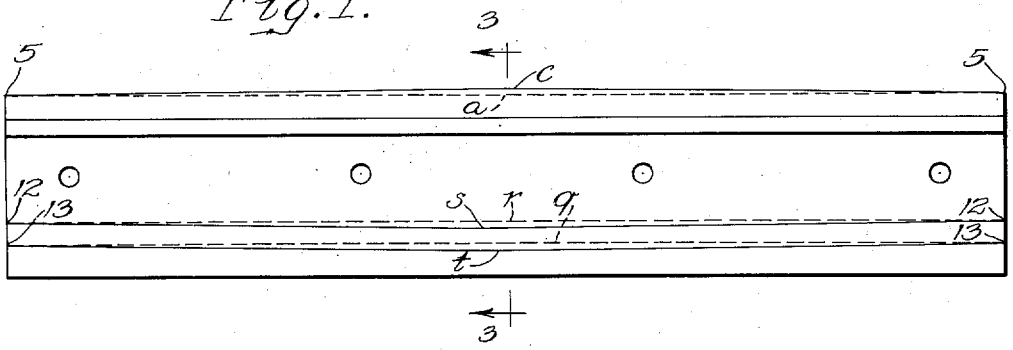
Fig. 1 is an elevational outside view of a standard fish plate or angle bar modified in accordance with my invention.

The flange crowning is represented by the perpendicular distance between the line *e—f* and the line *g—h* of Fig. 3, which also tapers to zero at 7 and 8. In order that these portions may be crowned, metal is pressed from the sectional area *i*, *j*, *k*, *l*, *m*, *n*, *o* and *p*, shown in Fig. 3, which area tapers to substantially zero at 9 and 10 at the ends of the bar, therefore thinning the web portion 11 approximately $\frac{1}{16}$th of an inch at the center. Metal may also be shifted from the area *q*, *r*, *s* and *t* of Fig. 3, which, likewise, tapers out at the ends at 12 and 13 as shown in Fig. 1. Since a portion of the metal displaced from the under side of the head is utilized to fill the depression caused by wear at the central portion of the head, the curvature of the concavity in the underside of the head is greater than the curvature of the convexed or crowned bearing or fishing surface of the head, as clearly illustrated in Figure 3.

It will be noted that in the reforming of the bar, the cross-sectional contour thereof is retained, as will be clear from Fig. 3. The bar thus produced, therefore, tapers in cross-section from the end portions toward the center portion thereof, and the center portion is of the same cross-sectional contour as the end portions, which is desirable. Also, in a bar reformed from a worn bar in accordance with my invention, as in Fig. 3, the cross-sectional contour at the center portion of the reformed bar is the same, or substantially so, as in the original bar and also corresponds to the cross-sectional contour of the ends of such bar. In cases where a selected element only of the bar is reformed, the central portion of such element conforms in cross-sectional contour to the end portions of such element, as will be clear from Fig. 3.

The web portion is thinned horizontally and the head and flange portions are crowned vertically, as shown, all at the center and tapering from each end, the vertical bending movement remaining substantially the same or increasing, and the weakness resulting at the center is offset by the crowned bearing surfaces. The drawing shows the changes which have been made in exaggerated form in order that they may be perceptible to the eye.

Since the web only of the bar is thinned horizontally, the head and foot portion, or flange, being thinned vertically, the width of the center portion of each of the respective bearing surfaces is not reduced relative to the end portions of such surfaces. When a bar is in use in a joint, the greatest wear occurs at the center portion of the respective bearing surfaces, the end portions of such surfaces being subjected to but slight wear. It becomes important, therefore, to retain the width of the center portion of at least one of the bearing surfaces. This center portion of the bearing surface should be substantially equal in width to the end portions of such surface and, under certain conditions, may advantageously be of greater width than the end portions. While I have illustrated, by way of example, a bar having a relatively wide flange, my invention, in its broader aspects, comprehends bars of various types having a head, a web, and a foot portion which may be in the form of a flange or of other suitable form and width for contact with the rail flange. I also contemplate applying my invention to either one of the bearing surfaces of the bars optionally, or to both of such surfaces.

In its broader aspects, and as previously noted, my invention comprises subjecting the more worn or central portion of the bar to forming pressure in such manner as to displace and redistribute the metal at such portion, thereby producing a bar which may be of either normal or abnormal height at its central portion, selected elements of the bar thus produced being thinner at the central portion thereof than at the end portions of the bar. Although I preferably thin the bar, at the worn or center portion, vertically on the head and flange portions more than horizontally, and horizontally on the web portion, at the inside of such portions, either the head or the web, or both, may be thinned horizontally. This horizontal thinning of the head results from modification of the outside surface thereof by application of forming pressure thereto, which may be employed if desired or necessary, as previously stated. The horizontal thinning of the head may be made secondary to the vertical thinning, so as to avoid narrowing the fishing surfaces to an undesirable extent. However, if the amount of narrowing of either one or both of the fishing surfaces is within the tolerance allowed, the head or the foot or flange of the bar, or both, may be narrowed horizontally from either side, the object of this horizontal thinning at the worn portion or center of the bar being the same as in the vertical thinning, to obtain redistribution of metal to one or both of the fishing surfaces at the worn or central portion of the bar.

Figure 4:
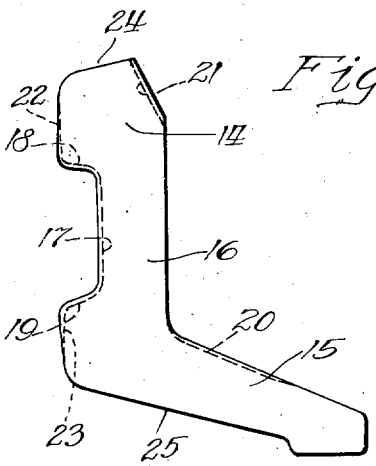
Fig. 4 is an end view of an uncrowned rail joint bar, in accordance with my invention, and in which forming pressure has been applied to the outside surfaces of the bar as well as the inside surfaces thereof.

In Figure 4 I have illustrated a bar produced in accordance with my invention, by applying forming pressure to both the inside and the outside of the bar. This bar comprises a head 14, a foot 15 including an outwardly extending flange, and a connecting web 16. The web 16 is thinned horizontally, and the head and the foot are thinned vertically at the central portion of the bar, by pressing into the inside of the web a horizontal concavity 17 tapering in depth toward the ends of the bar, and pressing into the inside of the head and the foot vertical concavities 18 and 19, respectively, which taper in depth toward the ends of the bar. I also press into the outside of the foot or flange 15 a concavity 20, at the central portion of the bar, which tapers in depth toward the ends of the bar. This concavity 20, due to the inclination of the flange, not only reduces the vertical thickness of the flange, but also reduces its horizontal thickness, so that the foot portion of the bar is thinner both horizontally and vertically, at the center of the bar than at the ends. In practice, in bars of ordinary type to which my invention is applied, the inner side of the head is inclined downwardly and inwardly, and the inner side of the foot is inclined upwardly and inwardly. As a result, the concavities 18 and 19, reduce the horizontal thickness of the head and foot, respectively, to a slight extent, as well as the vertical thickness thereof. In Figure 4, the concavities 17, 18, 19 and 20 produce a bar in which the web is thinner horizontally at the center of the bar than at the ends, and the head and foot are thinner, both horizontally and vertically, at the center of the bar than at the ends. This is equally true of the bar of Figure 3. I also press a concavity 21 in the outside of head 14 at the worn or central portion thereof, this concavity tapering in depth toward the ends of the bar in the same manner as concavity 17 of the web. Concavity 21 serves to further reduce the horizontal thickness of the head, at the central portion thereof, in much the same manner as concavity 20 reduces the horizontal thickness of the foot portion or flange. Obviously any selected elements of the bar may be subjected to forming pressure in the manner described, either at the inner side or the outer side of the bar, as conditions may require and as previously stated.

It can be seen from Figure 4 that while the head fishing 24 may be raised and restored at the central portion of the worn bar by pressing concavity 18 into the opposing surface, a similar result may be accomplished by pressing in a concavity at 21 or at 22. In the latter case the concavity at 22 may be on a vertically inclined surface so as not to disturb the fishing width of surface 24. This may also be done at 21 to keep within the bounds of head fishing width tolerance. If concavities are pressed in two or more of the surfaces at 18, 21 and 22, the amount of concavity in any one surface would be reduced, so as to avoid objectionable thinning on any one surface. The same may be said of the flange or foot portion of the bar. Concavities may be applied to one or both of the surfaces at 19 and 20, opposing the flange fishing 25, or a concavity may be applied to the adjacent surface at 23. Finally it may be applied to two surfaces or all three so as to reduce any objectionable thinning on one surface. In all cases illustrated, my invention consists in the provision of one or more concavities opposing or adjacent to a head or flange central fishing surface, the effective height of said fishing being thus restored.

My invention, therefore, comprehends the subjecting of one or more selected elements of the bar, at the central or worn portion thereof, to forming pressure in such manner as to redistribute the metal at the central or worn portion of the bar and thereby raise such portion of the bar to normal fishing height, or to a fishing height greater than normal, as conditions may require, while maintaining the original cross-sectional contour of the bar, or having the cross-sectional contour of the central portion of the reformed bar correspond substantially to the end portions thereof.

The dies which I employ are of the character shown in my prior copending application, Serial No. 122,864, filed July 16th, 1926, and I employ the pins or pegs for holding the bolt holes in proper position and to proper size. I find, however, that the severe duty to which these pins or pegs have heretofore been subjected is now very greatly reduced, with the result that the pegs or pins and the dies themselves may be employed for many more operations without wear or injury than has been possible heretofore because of the fact that the end parts of the bars are, according to the present invention, not subjected to the enormous pressure which was heretofore employed in an attempt to secure the necessary metal for filling out the worn central portion of the bar. As above pointed out, the outward movement of metal from the central longitudinal part of the web may be carried to a point where the original height or line of the bearing surfaces is restored to that of the original bar or it may be carried beyond the original line of the bearing surfaces to produce the desired crown. This is capable of certain variations without departing from the spirit of my invention, and I do not intend to be limited by the details herein set forth, but desire to avail myself of such variations as come within the scope of the appended claims.

I claim:—

1. A reformed fish plate for rail joints, said plate comprising a head portion, a web portion, and a foot portion, and having a crowned head bearing surface, and substantially all of the web portion being thinner at the center than at the ends, the center portion of said surface being substantially equal in width to the end portions thereof.

2. An angle bar for rail joints, said bar comprising a head portion, a web portion, and a foot portion, and having a crowned foot portion bearing surface, and a web portion substantially all of which is thinner at the center than at the ends, the center portion of said surface being substantially equal in width to the end portions thereof.

3. An angle bar for rail joints, said bar comprising a head portion, a web portion, and a foot portion, and having head and foot portion bearing surfaces, substantially all of the web portion being thinner and higher at the center than at the ends, the center portions of said surfaces being substantially equal in width to the end portions thereof.

4. A reformed angle bar for rail joints comprising head, web and flange portions, convex bearing surfaces on said head and flange portions, concave surfaces on said head and flange portions opposite said convex surfaces, said concave surfaces being of greater curvature than their opposing convex surfaces and extending to the ends of the bar.

5. A reformed angle bar for rail joints comprising head, web and flange portions, convex bearing surfaces on said head and flange portions, concave surfaces on said head and flange portions opposite said convex surfaces, one of the surfaces of said web portion being concave from the center of the bar to the ends.

6. A reformed angle bar for rail joints comprising head, web and flange portions, convex bearing surfaces on said head and flange portions, concave surfaces on said head and flange portions opposite said convex surfaces, the web portion being higher at the center than at the ends, and one of its outer surfaces having a concavity extending from one end of the bar to the other.

7. A renewed bar comprising a head portion, a web portion, and a foot portion, the entire web being thinner at the central longitudinal part thereof and the inside of the web being concaved, said bar having a bearing surface the center portion of which is substantially equal in width to the end portions thereof.

8. A renewed bar comprising a head portion, a web portion, and a foot portion, and having angular bearing surfaces restored to be cooperable with new rails and having concavities in the central longitudinal portions of the web and foot portion from which metal has been removed by lateral displacement, the center portions of said surfaces being substantially equal in width to the end portions thereof and the web concavity extending from the center of the bar to the ends.

9. An angle bar for rail joints, said bar comprising a head portion, a web portion and a foot portion, and having head and foot portion bearing surfaces and a web portion thinner throughout its height at the center than at the ends, the center portions of said surfaces being substantially equal in width to the end portions thereof.

10. An angle bar for rail joints, said bar comprising a head portion, a web portion, and a foot portion, and having head and foot portion bearing surfaces and a web portion with the outer surface straight throughout its length and inner surface concave throughout its length and lengthwise of the bar, the center portions of said bearing surfaces being substantially equal in width to the end portions thereof.

11. An angle bar for rail joints, said bar comprising a head portion, a web portion, and a foot portion, and having head and foot portion bearing surfaces and a web portion with one surface concave longitudinally throughout its height, the center portions of said bearing surfaces being substantially equal in width to the end portions thereof.

12. An angle bar for rail joints, said bar comprising a head portion, a web portion, and a foot portion, said web portion being thinner at the center than at the ends throughout its height, the bar having a bearing surface the center portion of which is substantially equal in width to the end portions thereof.

13. An angle bar for rail joints with the web portion higher at the center than at the ends and the head portion thinner vertically at the center than at the ends and increasing gradually in thickness to the ends.

14. An angle bar for rail joints with the web higher at the center than at the ends, and all of each of the head and flange portions thinner vertically at the center than at the ends.

15. An angle bar for rail joints, said bar comprising a flange disposed for fishing contact with the rail flange at both the center portion and the end portions of the bar and of less vertical thickness at its central portions than at its ends with the thickness increasing gradually to the ends.

16. An angle bar for rail joints, said bar comprising a flange disposed for fishing contact with the rail flange and diminishing in vertical thickness from its ends to its center portion.

17. An angle bar for rail joints, said bar comprising a head and a flange having fishing surfaces for contact with the corresponding fishing surfaces of the rail, the head and flange of the bar diminishing in vertical thickness inward from the ends of the bar to the center portion thereof.

18. A rail joint bar reformed from a worn rolled bar originally provided with top and bottom rail fishing contact surfaces at its center portion and end portions, one of the elements of the reformed bar having a fishing surface and being thinner horizontally at its center portion than at its ends, the thinning being applied to the whole of one of the sides of said element.

19. A rail joint bar reformed from a worn rolled bar originally provided with top and bottom rail fishing contact surfaces at its center portion and end portions, one of the elements of the reformed bar having a fishing surface and being thinner vertically on one of its surfaces opposite a fishing surface at the center portion of the bar, the vertical thickness of said element gradually increasing toward the ends of the bar.

20. An angle type of rail joint bar reformed from a worn rolled bar originally provided with top and bottom rail fishing contact surfaces at its center portion and end portions, the outer flange portion of the reformed bar being thinner vertically at its center portion than at the ends.

21. A rail joint bar reformed from a worn rolled bar originally provided with top and bottom rail fishing contact surfaces at its center portion and end portions, one of the elements of the reformed bar having a fishing surface and being thinner vertically at its center portion than at the ends with the thickness increasing gradually from the center portions to the ends.

22. A rail joint bar reformed from a worn rolled bar originally provided with top and bottom rail fishing contact surfaces at its center portion and end portions, one of the elements of the reformed bar having a fishing surface and being thinner horizontally at its center portion than at its end portions, the thickness of said element increasing gradually from the center portion to near the ends.

23. An angle type rail joint bar having the central portion of its outward flange thinner vertically at its center portion than at the end portions thereof.

In witness whereof, I have hereunto subscribed my name this 31st day of October, A. D. 1930.

GEORGE LANGFORD.